United States Patent
Dickinson

(10) Patent No.: US 8,520,805 B2
(45) Date of Patent: Aug. 27, 2013

(54) VIDEO E911

(75) Inventor: Richard Dickinson, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1691 days.

(21) Appl. No.: 11/802,691

(22) Filed: May 24, 2007

(65) Prior Publication Data

US 2008/0273670 A1 Nov. 6, 2008

Related U.S. Application Data

(60) Provisional application No. 60/924,177, filed on May 2, 2007.

(51) Int. Cl.
*H04M 11/04* (2006.01)

(52) U.S. Cl.
USPC ............... 379/45; 379/38; 379/39; 379/46; 379/51

(58) Field of Classification Search
USPC ....................................... 379/37–51
See application file for complete search history.

(56) References Cited

U.S. PATENT DOCUMENTS

| | | | |
|---|---|---|---|
| 4,625,081 A | 11/1986 | Lotito | |
| 6,529,500 B1 | 3/2003 | Pandharipande | |
| 6,529,722 B1 | 3/2003 | Heinrich | |
| 6,744,858 B1 | 6/2004 | Ryan | |
| 6,775,534 B2 | 8/2004 | Lindgren | |
| 6,799,049 B1 | 9/2004 | Zellner | |
| 6,813,264 B2 | 11/2004 | Vassilovski | |
| 6,940,950 B2 | 9/2005 | Dickinson et al. | |
| 6,968,044 B2 | 11/2005 | Beason | |
| 7,130,630 B1 | 10/2006 | Enzmann | |
| 7,136,466 B1 | 11/2006 | Gao | |
| 7,171,220 B2 | 1/2007 | Belcea | |
| 7,177,397 B2 | 2/2007 | McCalmont | |
| 7,177,399 B2 | 2/2007 | Dawson | |
| 7,184,418 B1 * | 2/2007 | Baba et al. | 370/331 |
| 7,194,249 B2 | 3/2007 | Phillips | |

(Continued)

FOREIGN PATENT DOCUMENTS

| | | |
|---|---|---|
| WO | WO99/22546 | 5/1999 |
| WO | WO02/11407 | 2/2002 |
| WO | WO2004/098213 | 11/2004 |

OTHER PUBLICATIONS

International Search Report in PCT/US/2010/01938 dated Sep. 30, 2010.

(Continued)

*Primary Examiner* — Duc Nguyen
*Assistant Examiner* — Ibraham Sharifzada
(74) *Attorney, Agent, or Firm* — William H. Bollman

(57) ABSTRACT

E911 call routing technology that employs pseudo Automatic Number Indicators (pANI) is enhanced to provide video E911 services. Digital photos or video from a camera-equipped phone are associated with a pseudo Automatic Number Identification (pANI), e.g., an emergency service routing key (ESRK), or an emergency service query key (ESQK) in the VoIP scenario, and a dedicated email address is associated with each pseudo Automatic Number Indicator (pANI) for the emergency caller to email the image content to. A video E911 web database containing associations between pANIs and staged image content associated with the emergency caller relating to the pANI, is maintained at an appropriate video E911 web site hosted by a mobile positioning center (MPC) or VoIP positioning center (VPC).

27 Claims, 7 Drawing Sheets

(56) References Cited

U.S. PATENT DOCUMENTS

| | | |
|---|---|---|
| 7,245,900 B1 | 7/2007 | Lamb |
| 7,260,186 B2 | 8/2007 | Zhu |
| 7,260,384 B2 | 8/2007 | Bales et al. |
| 7,330,899 B2 | 2/2008 | Wong |
| 7,333,480 B1 | 2/2008 | Clarke |
| 7,366,157 B1 | 4/2008 | Valentine |
| 7,369,530 B2 | 5/2008 | Keagy |
| 7,412,049 B1 | 8/2008 | Koch |
| 7,440,442 B2 | 10/2008 | Grabelsky et al. |
| 7,453,990 B2 | 11/2008 | Welenson |
| 7,573,982 B2 | 8/2009 | Breen |
| 7,617,287 B2 | 11/2009 | Vella |
| 7,702,081 B1 | 4/2010 | Klesper |
| 7,751,826 B2 | 7/2010 | Gardner |
| 7,787,611 B1 | 8/2010 | Kotelly |
| 2001/0040886 A1 | 11/2001 | Jimenez |
| 2001/0049274 A1 | 12/2001 | Degraeve |
| 2002/0058515 A1 | 5/2002 | Holler |
| 2002/0118796 A1 | 8/2002 | Menard |
| 2002/0126656 A1 | 9/2002 | Park |
| 2003/0026245 A1 | 2/2003 | Ejzak |
| 2003/0086539 A1 | 5/2003 | McCalmont |
| 2003/0096623 A1 | 5/2003 | Kim |
| 2003/0109245 A1 | 6/2003 | McCalmont |
| 2003/0148757 A1 | 8/2003 | Meer |
| 2004/0043775 A1 | 3/2004 | Kennedy |
| 2004/0097243 A1 | 5/2004 | Zellner |
| 2004/0150518 A1 | 8/2004 | Phillips |
| 2004/0152493 A1 | 8/2004 | Phillips |
| 2004/0176123 A1 | 9/2004 | Chin |
| 2004/0180671 A1 | 9/2004 | Spain |
| 2004/0184584 A1 | 9/2004 | McCalmont |
| 2004/0190497 A1* | 9/2004 | Knox ............................ 370/352 |
| 2004/0203575 A1 | 10/2004 | Chin |
| 2004/0203732 A1 | 10/2004 | Brusilovsky |
| 2004/0247090 A1 | 12/2004 | Nurmela |
| 2005/0003797 A1 | 1/2005 | Baldwin |
| 2005/0021769 A1 | 1/2005 | Kim |
| 2005/0030977 A1 | 2/2005 | Casey |
| 2005/0048987 A1 | 3/2005 | Glass |
| 2005/0053209 A1* | 3/2005 | D'Evelyn et al. ............. 379/111 |
| 2005/0083911 A1 | 4/2005 | Grabelsky |
| 2005/0085257 A1 | 4/2005 | Laird |
| 2005/0107673 A1 | 5/2005 | Ball |
| 2005/0111630 A1 | 5/2005 | Potorney |
| 2005/0136885 A1* | 6/2005 | Kaltsukis ................... 455/404.1 |
| 2005/0169248 A1 | 8/2005 | Truesdale |
| 2005/0190892 A1 | 9/2005 | Dawson |
| 2005/0201528 A1 | 9/2005 | Meer |
| 2005/0201529 A1 | 9/2005 | Nelson |
| 2005/0261002 A1 | 11/2005 | Cheng |
| 2006/0058049 A1 | 3/2006 | McLaughlin |
| 2006/0068753 A1 | 3/2006 | Karpen |
| 2006/0069503 A1 | 3/2006 | Suomela et al. |
| 2006/0125692 A1 | 6/2006 | Wang |
| 2006/0135132 A1 | 6/2006 | Cai |
| 2006/0188083 A1 | 8/2006 | Breen |
| 2006/0193447 A1 | 8/2006 | Schwartz |
| 2006/0222151 A1* | 10/2006 | Goldman et al. .............. 379/45 |
| 2006/0293024 A1 | 12/2006 | Benco |
| 2007/0003024 A1* | 1/2007 | Olivier et al. ................... 379/45 |
| 2007/0019614 A1 | 1/2007 | Hoffman |
| 2007/0021908 A1 | 1/2007 | Jaugilas |
| 2007/0036139 A1 | 2/2007 | Patel |
| 2007/0041513 A1 | 2/2007 | Gende |
| 2007/0115941 A1 | 5/2007 | Patel |
| 2007/0121601 A1 | 5/2007 | Kikinis |
| 2007/0160036 A1 | 7/2007 | Smith |
| 2007/0253429 A1 | 11/2007 | James |
| 2007/0263610 A1 | 11/2007 | Mitchell |
| 2007/0293205 A1 | 12/2007 | Henderson |
| 2008/0081646 A1* | 4/2008 | Morin et al. .................. 455/466 |
| 2008/0091646 A1 | 4/2008 | Morin |
| 2009/0003535 A1 | 1/2009 | Grabelsky |
| 2009/0128404 A1 | 5/2009 | Martino |
| 2010/0003954 A1 | 1/2010 | Greene |

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

European Search Report in European appl. No. 06851433.0-2413 dated Aug. 8, 2008.

"Location Services (LCS); Functional Description; stage 2; ETSI TS 101 724," ETSI Standards, Jun. 2004 (2004-2006), XP014016068, sect. 4, section 5.6.6., fig 3, sect. 7.6.2, fig. 30.

Schulzrinne et al., Emergency Services for Internet Telephony Systems draft-schulzrinne-sipping-emergency-arch, IETF Standard Working Draft, Feb. 4, 2004, 1-22.

* cited by examiner

VIDEO E911

This application claims priority from U.S. Provisional Application No. 60/924,177, filed May 2, 2007, entitled "Video E911", to Dickinson, the entirety of which is expressly incorporated herein by reference.

BACKGROUND OF THE INVENTION

1. Field of the Invention

This invention relates to emergency call systems (e.g., E9-1-1), including wireless and Internet Protocol (IP) based Voice Over Internet Protocol (VoIP) emergency call systems.

2. Background of the Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate PSAP, based upon the caller's phone number (ANI) or special identifier (P-ANI, or "Pseudo Automatic Number Identifier", also referred to as "ESxK"), and includes the transmission of callback number and location information to the call taker. E9-1-1 may be implemented for landline, cellular or VoIP networks. Regardless of the network type, a 9-1-1 service becomes E-9-1-1 when automatic number identification and automatic location information related to the call is provided to the 9-1-1 operator at the PSAP.

A Public Service Answering Point (PSAP) is a dispatch office that receives 9-1-1 calls from the public. A PSAP may be a local, fire or police department, an ambulance service or a regional office covering all services. In some cases, typically in situations in which the intended PSAP cannot be accessed due to infrastructure failure or overflow, 911 calls may be routed to an Emergency Call Center (ECC). As used herein, the term "PSAP" refers to either a public safety access point (PSAP), or to an Emergency Call Center (ECC).

PSAPs typically acquire callers' location information via an automatic location identifier (ALI) database. FIG. 4 shows a conventional landline (PSAP) to (ALI) connection.

In particular, FIG. 4 shows a PSAP 400 connected to one Automatic Location Identifier (ALI) database 401. An ALI is a database that accepts a PSAP query with telephone number, relates the telephone number to an address and provides that address (location information) back to the PSAP in a manner that works for the customer premise equipment (CPE) display. An ALI is typically owned by the PSAP's System Service Provider (SSP, typically a LEC) or by the PSAP itself, and may be regional (i.e. connected to many PSAPs) or standalone (i.e. connected to only one PSAP). There is a standard interface protocol for PSAP-ALI connection/communication, although each PSAP typically customizes the data presentation on their CPE.

Upon receiving a 9-1-1 call, the PSAP 400 queries the ALI 401 for location data. The ALI database 401 accepts the query from the PSAP 400 for location. The query includes the telephone number of an emergency caller. The ALI database 401 relates the received telephone number to a physical street address and provides that street address (location information) back to the PSAP 400 in a manner that works for the customer premise equipment (CPE) display at the PSAP 400.

Most PSAPs are publicly funded and maintain only one outside ALI connection for both landline and non-landline networks. Regional ALIs can support numerous PSAPs. Most ALIs also support one or more connections to other ALIs. Some ALIs (usually those owned and operated by individual PSAPs) are able to support only one outside connection to another ALI. External ALIs are usually operated and maintained by a positioning center. Positioning centers typically exist to support E911 solutions for VoIP (VPC) or mobile (MPC) carriers.

FIG. 5 shows a context diagram for a conventional non-landline positioning center (e.g., a VoIP or wireless positioning center, xPC).

In particular, the ALI database 401a includes a conventional pANI (ESQK or ESRK) in a location request sent to an appropriate positioning center 402 (XPC). The emergency services key (ESQK or ESRK) is used, by the positioning center 402 in lieu of a telephone number (ANI) to look up the location and other call information associated with the emergency call.

In non-landline telephony, the PSAPs 400a query the ALI 401a for location information. However, the ALI 401a is not pre-provisioned with location data for non-landline calls (e.g. cellular, VoIP etc) and must communicate with other network entities to obtain and deliver location data to the PSAP 400a.

Non-landline telephony standards (e.g. cellular, VoIP etc) have mandated that ALIs 401a maintain connectivity to a positioning center 402 that is able to provide current location data for a non-landline call. In the current state of technology, the positioning center 402 provides the caller's location and the callback number to the ALI, which passes it to the requesting PSAP. An ALI may maintain connectivity to more than one positioning center. An XPC may also be connected to multiple ALIs. Multiple interface types exist to support these connections—both standard and non-standard (e.g. NENA-02, E2/E2+/V–E2(ESP), PAM, etc.). The ALI typically establishes the interface protocol, while the XPC must accommodate that protocol. Thus XPCs typically support multiple interface protocols, the ALIs support only one.

Whether landline or non-landline, conventional emergency call centers, e.g., public safety access points (PSAPs) 400a, use emergency services keys to query for location information. Technically, these keys are categorized as ANI or pANI. ANI are used with wireline 911 calls, and consist simply of the callers landline telephone number. pANI and used for non-wireline calls. Emergency services query keys (ESQK) or an emergency services routing keys (ESRK), collectively referred to herein as ESxK, are both forms of pANI. Although their functions are identical, ESQKs are used for VoIP calls while ESRKs are used for wireless (cellular) calls.

An emergency service key is associated with a particular selective router 417a associated with a given public safety access point (PSAP) 400a. The emergency services keys ESQK and ESRK are conventionally used to query the automatic location identification (ALI) database 401 for the location of a given emergency caller. An emergency services key is delivered via the voice call path to the E9-1-1 selective router 417a. The emergency services key is used by a selective router 417a as a key to determine which PSAP should receive the call. The emergency services key is delivered by the selective router 417a to a PSAP 400a as the calling number/ANI for the emergency call, and is subsequently used by the PSAP 400a to request automatic location information (ALI) information indicating the location of the device making the emergency call. Conventional emergency service keys conform to ten-digit North American Numbering Plan Number definitions and they may or may not be dialable.

Voice-Over-Internet Protocol (VoIP) is a technology that emulates a phone call, but instead of using a circuit based system such as the telephone network, utilizes packetized data transmission techniques most notably implemented in the Internet. 911 calls made using VoIP technology must reach the correct PSAP, but there currently is no uniform interface to the various PSAPs for call delivery because the technology for connecting calls varies. For instance, not all PSAPs are Internet Protocol (IP) capable. Some PSAPs are accessed via ordinary public switched telephone network (PSTN) telephone lines. Some PSAPs are accessed through selective routing such as direct trunks. Still other PSAPs are accessed using IP connections. There is no uniformity among the thousands of different PSAPs for receiving VoIP calls.

Moreover, some Public Safety Access Points (PSAPs) are not enhanced, and thus do not receive the callback or location information at all from any phone, landline or wireless.

The use of VoIP technology is growing quickly. As people adopt voice-over-IP (VoIP) technology for routine communications, the inventors herein recognize that there is a growing need to access E911 services including provision of location information from a VoIP device.

The existing E911 infrastructure is built upon copper wire line voice technology and is not fully compatible with VoIP. Given VoIP technology, there are at least three VoIP scenarios:

1. A VoIP UA that is physically connected to a static data cable at a "home" address. For instance, an Analog Telephone Adapter (ATA) that is connected to the "home" data cable and uses traditional telephone devices. This scenario is defined as "static" VoIP.
2. A VoIP UA that is physically connected to a data cable at a location different than its "home" address. For instance, a laptop computer device utilized away from home as a VoIP software telephone would be a VoIP 'visitor' device as described by this scenario. This scenario is defined as "nomadic" VoIP.
3. A VoIP UA that is wireless, physically disconnected from any data cable. In this situation, the VoIP UA connects to the VoIP service provider via either a wide-area wireless technology (e.g., cellular, PCS, WiMAX) or via a local-area wireless technology (e.g., Wireless Fidelity (WiFi), UWB, etc.) using a laptop computer or handheld device. This scenario is defined as "mobile", although the distinction between VoIP and wireless are blurred.

VoIP phone calls are routed to a VoIP voice gateway, from which they are passed on to their destination. A VoIP voice gateway or soft switch is a programmable network switch that can process the signaling for all types of packet protocols. Also known as a 'media gateway controller,' 'call agent,' or 'call server', such devices are used by carriers that support converged communications services by integrating SS7 telephone signaling with packet networks. Softswitches can support, e.g., IP, DSL, ATM and frame relay.

The challenges evident with respect to determining the location of a calling VoIP telephone is perhaps most evident with respect to its use to make an emergency call (e.g., a 911 call). Nevertheless, VoIP telephone technology is quickly replacing conventional switched telephone technology. However, because VoIP is Internet Protocol (IP) based, call related information such as CallerID type services may not be available or accurate. A location of a given VoIP device may be manually provisioned to be at a given geographic location, or queried from a home location register (HLR) in a mobile system. Technologies for automatically locating VoIP devices are in their infancy.

In addition, some Public Safety Access Points (PSAPs) are not enhanced, and thus do not receive the callback or location information at all from any phone; landline, cellular or VoIP.

Moreover, there is complexity in public access to Public Safety Answering Points due to lack of a Session Initiation Protocol (SIP) Uniform Resource Identifier (URI) for all PSAPs. (SIP is the IP-based protocol defined in IETF RFCs 3261 and 2543.) SIP is one of two dominant protocols used by the VoIP industry. URI is the addressing technology for identifying resources on the Internet or a private intranet. URIs were originally defined as two types: Uniform Resource Locators (URLs) which are addresses with network location, and Uniform Resource Names (URNs) which are persistent names that are address independent. Today, a URI is defined by its purpose rather than the URL vs. URN classification.) Some PSAPs are accessed only by conventional telephone line, others only by direct telephone trunk lines. Not all PSAPs are accessible via the Internet.

FIG. 6 shows basic conventional VoIP elements required to interconnect a VoIP emergency E911 caller to a relevant public safety access point (PSAP).

In particular, as shown in FIG. 6, VoIP telephone devices 102a and 102b, (collectively referred to as 102) are connected to respective VoIP Service Provider (VSP) soft switches 104a, and 104b, (collectively referred to as 104) using an Internet Protocol (IP) connection, most commonly over the Internet. The VoIP service provider's soft switch 104 in turn communicates with a respective VoIP Positioning Center (VPC) 106a, 106b, (collectively referred to as 106) using an appropriate IP connection. Each VSP requires use of their own VPC, as depicted in FIG. 5.

FIG. 7 shows in more detail conventional VoIP elements required by a VPC to interconnect a VoIP emergency E911 caller to a relevant public safety access point (PSAP).

In particular, as shown in FIG. 7, each VPC 106 comprises its own respective route determination module 404, call delivery module 406, and provisioning list 408.

A respective location information server (LIS) 108 services each of the VPCs 106. The LIS 108 is responsible for storing and providing access to the subscriber location information needed for E9-1-1 call processing (as defined by the NENA VoIP Location Working Group).

A conventional VoIP Positioning Center (VPC) 106 is a system that attempts to determine the appropriate or correct PSAP 114 that a VoIP emergency E911 call should be routed to based on the VoIP subscriber's position. The conventional VPC 106 also returns associated routing instructions to the VoIP network. The conventional VPC 106 additionally provides the caller's location and the callback number to the relevant PSAP through the automatic location identifier (ALI) (The ALI is a database that accepts a PSAP query, and using that relates a specific telephone number to a street address. In the case of an Emergency Services Query Key (ESQK), the ALI database steers the query to the appropriate VPC and steers the response back to the PSAP. An ALI is typically owned by a LEC or a PSAP.)

Further as shown in FIG. 7, each VSP routes the emergency 9-1-1 call, without location object added, to their VPC 106. The VPC must determine the correct PSAP 114 (collectively represented by PSAP 114a, 114b and 114c) and route to it using the appropriate technology.

In a first scenario, the VPC 106 passes the 9-1-1 call to the PSAP 114a using an INVITE telephone number message, via a media gateway 110 that translates between the IP protocol of the INVITE message and a telephone line interface, and interfaces with the public switched telephone network (PSTN) 112.

In a second scenario, the VPC 106 passes the 9-1-1 call to the PSAP 114b using an INVITE S/R message, via an Emergency Services Gateway (ESGW) 120 and selective router 122. An ESGW is a media gateway dedicated to E911 and connected to the Selective Router (S/R) via direct trunks. In this scenario, the selective router 122 is connected to the relevant PSAP 114b via direct trunks.

In a third scenario, the VPC 106 passes the 9-1-1 call to the PSAP 114c using an INVITE PSAP message, via IP, to the PSAP 114c. In the second and third scenario, the ALI 126 must be inter-connected with each VPC 106 (*a,b*). Furthermore, each VPC is burdened with supporting all the various ALI protocols: ve2, e2, PAM, legacy NENA, etc.

Thus, most Public Safety Answering Points (PSAPs) receive 911 calls via designated voice and data circuits called the "E911 network" that are not accessible via the Public Switched Telephone Network (PSTN). Network elements include a selective router and dedicated circuits between that router and the PSAP. Access to the selective router is via dedicated circuits between the ESGW and the S/R. As a result, the selective router cannot be directly accessed via the PSTN. Moreover, the amount of data that can be forwarded to the PSAP is extremely limited and ASCII data based.

There is a need for a method and technology allowing broader data based services in an E911 system.

SUMMARY OF THE INVENTION

In accordance with the principles of the present invention, in an emergency E911 network, a method and apparatus for associating digital image content with an emergency E911 caller, comprising associating a dedicated emergency E911 email address with each pseudo Automatic Number Indicator (pANI) in the emergency E911 network. Importantly, digital image content is staged, the digital image content being sourced by an emergency E911 caller identified by the dedicated emergency E911 email.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
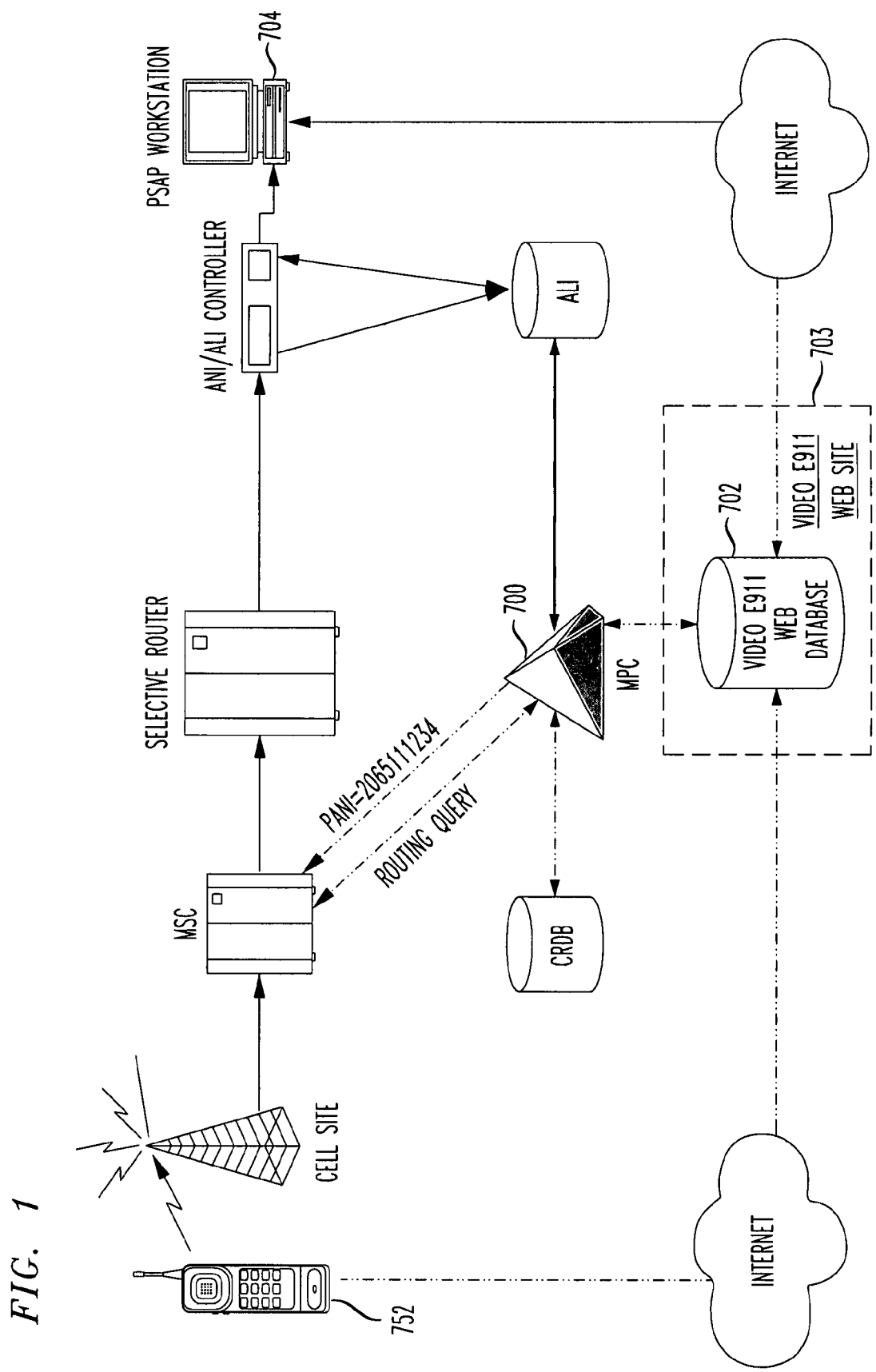
FIG. 1 shows a video E9-1-1 solution, in accordance with the principles of the present invention.

The present invention applies to any E911 call routing technology that employs pseudo Automatic Number Indicators (pANI) to provide video E911 services.

With the coming of Internet Protocol (IP)-based "Next Generation" E911 services, the present inventor has appreciated that more and more networks include equipment capable of receiving video from a camera-equipped phone. Moreover, the inventor appreciated that most wireless E911 calls employ pANI called Emergency Service Routing Keys (ESRKs). Even most nomadic VoIP E911 calls, and potentially all VoIP E911 calls, use pANI called Emergency Service Query Keys (ESQKs). The present inventor also appreciated the advantages of image content (e.g., digital photograph, digital video clip, digital video stream) to PSAPs during or in relation to an emergency E911 call.

In accordance with the present invention, the inventor herein provides a video E911 service network wherein a dedicated email address is associated with each pseudo Automatic Number Indicator (pANI).

Typically, video is transmitted via email or short message services (SMS) from a telephone device. To send a photo, a caller must be informed of the email address to which to send the photo. This can be problematical in an E911 network in a number of ways. First, what if the PSAP has no email address? Moreover, even if the PSAP does have an email address, how does each dispatcher access the emailed photo? Even if the PSAP does have access to the photo, how do you sort out which picture goes with which incident?

Proposals exist for callers to forward video to a special email address, where a photo is staged at a web site that can be accessed by authorized PSAPs. However, the existing solutions provide no mechanism for sorting out which photos go with which incident. This becomes exacerbated in a call transfer scenario where one PSAP is required to manually forward an emergency callers' email to another PSAP.

In a typical wireless emergency E911 call, the mobile switching center (MSC) that receives the emergency call may serve multiple Public Safety Answering Points (PSAPs), which are in turn served by multiple selective routers. To determine which PSAP and which selective router should receive a given E911 call, the MSC relies upon a third party network device, known as a Mobile Positioning Center (MPC), to match the coverage area of the cell tower serving the E911 caller with the jurisdictional boundary of the proper PSAP. When the MPC determines which PSAP has jurisdiction, the MPC assigns a routing number (ESRK) to the call and stages data related to the call (location and call-back number) in a separate database. The MPC then communicates the ESRK to the MSC. Using translations that relate the ESRK to specific trunks, the MSC forwards the call (along with the ESRK) to the trunk that leads to the correct selective router. Using similar logic, the selective router then routes the call and the ESRK to the correct PSAP. The PSAP then queries the Automatic Location Indicator (ALI) database with the ESRK. The ALI database "steers" the query to the MPC database, which forwards the callers data back to the ALI and hence to the PSAP.

FIG. 1 shows a video E9-1-1 solution, in accordance with the principles of the present invention.

In particular, as shown in FIG. 1, if one PSAP must transfer a call to another PSAP (a common occurrence with wireless E911 calls), the receiving PSAP receives the ESRK in the transfer, and then queries their ALI database, which again steers the query to the MPC, resulting in the same data display at the receiving PSAP.

Unfortunately, content that can be transmitted may be limited by existing data links between the ALI and the MPC. Moreover, the capabilities of particular PSAP equipment may also limit the display of certain next generation content such as video. The present inventors have developed a network video E911 web site that allows PSAPs access to image content such as photographs and/or video (e.g., video clips or a live streamed video feed), as capabilities of ALI to MPC links and PSAP equipment progresses.

In accordance with the principles of the present invention, a video E911 web site 703 is established, preferably hosted by the MPC 700. This MPC video E911 web site 703 preferably includes a video E911 web database 702 containing a variety of data, e.g., medical records, floor plans, personal info about the address (such as number of children, pets, etc.) This information can be staged dynamically, e.g., by relating the caller's telephone number with the specialized additional data, and then relating the data to the assigned ESRK. A PSAP dispatcher 704 can query the video E911 web database 702 at the video E911 web site 703 using the ESRK or the phone number.

Figure 2:
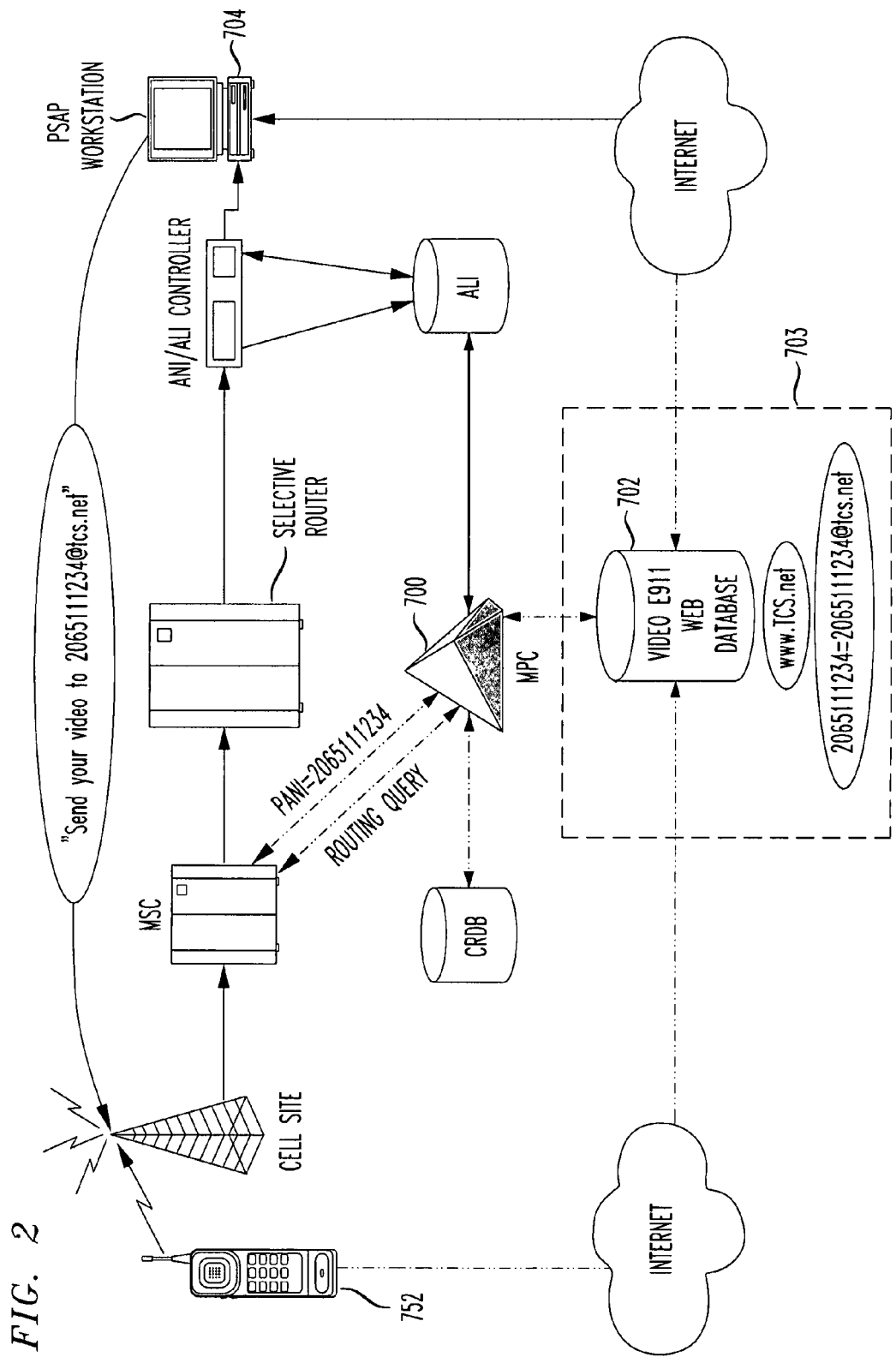
FIG. 2 shows a video E911 message being sent to a relevant PSAP, in accordance with the principles of the present invention.

FIG. 2 shows a video E911 message being sent to a relevant PSAP, in accordance with the principles of the present invention.

In particular, as shown in FIG. 2, video is a dynamic item of data, however, that cannot typically be pre-assigned to a specific phone number and thus pre-staged in the video E911 web database 702. In the disclosed embodiments, the PSAP dispatcher 704 informs the emergency E911 caller 752 of an email address to which to send image content, e.g., a photo taken, a video clip made, or live video stream, e.g., from the caller's cellular phone 752. The cellular phone 752 from which the image content is sent may be the one on which the caller is currently calling from, or another phone usable by the emergency caller. In the exemplary embodiment shown in FIG. 2, the PSAP dispatcher 704 informs the cellular phone 752 user, e.g., to "Send your video to 2065111234@tcs.net".

The email address (e.g., 2065111234@tcs.net) to which to send the image content to is in prior art typically a single email address for the appropriate PSAP, or even a single email address for the video E911 web site 703 for directed staging at the video E911 web site 703. In any event, the disclosed embodiments in the inventive solution preferably assign a dedicated email address to be affiliated with each ESRK.

In the inventive method, the PSAP dispatcher 704 preferably accesses the video E911 web site 703 and queries the video E911 web database 702 using the call back number or the ESRK. Among the data displayed by the video E911 web site 703 is preferably a dedicated email address for any image content, e.g., photo, video clip, live video stream, etc. related to that emergency E911 call. In the exemplary embodiment of FIG. 2, the video E911 web database 702 is, e.g., www.TCS.net, and includes the association of the dedicated email address 2065111234=2065111234@tcs.net.

The PSAP dispatcher 704 preferably relays the dedicated email address to the emergency E911 caller 752, who then emails their image content, e.g., photo(s), video clip, live video stream, etc., to that email address (e.g., to 2065111234@tcs.net).

Upon receipt of the video E911 email with attached or contained image content, the MPC 700 stages the image content, e.g., video data, along with other data related to that emergency E911 call.

After the emergency E911 call is terminated, the image content data may be discarded or archived, dependent upon the needs of the particular application, and the ESRK preferably becomes available for reuse. Thus, while the ESRK can later be re-assigned to another E911 emergency call, the email address affiliated with the ESRK preferably does not change. Accordingly any subsequent or otherwise new image content, e.g., photo(s), video clip, live video stream, etc., would be staged with the ESRK, along with other data available related to the next caller.

A typical email address preferably consists of the telephone number (e.g., 10-digit telephone number in North America), e.g., ESRK@MPC.com (2065111234@TCS.com).

In the case of an emergency E911 call placed over a voice over Internet Protocol (VOIP) network, the invention is similarly embodied, and described, albeit with the replacement of "ESRK" with "ESQK", and "mobile positioning center (MPC)" with "VoIP positioning center (VPC)".

Figure 3:
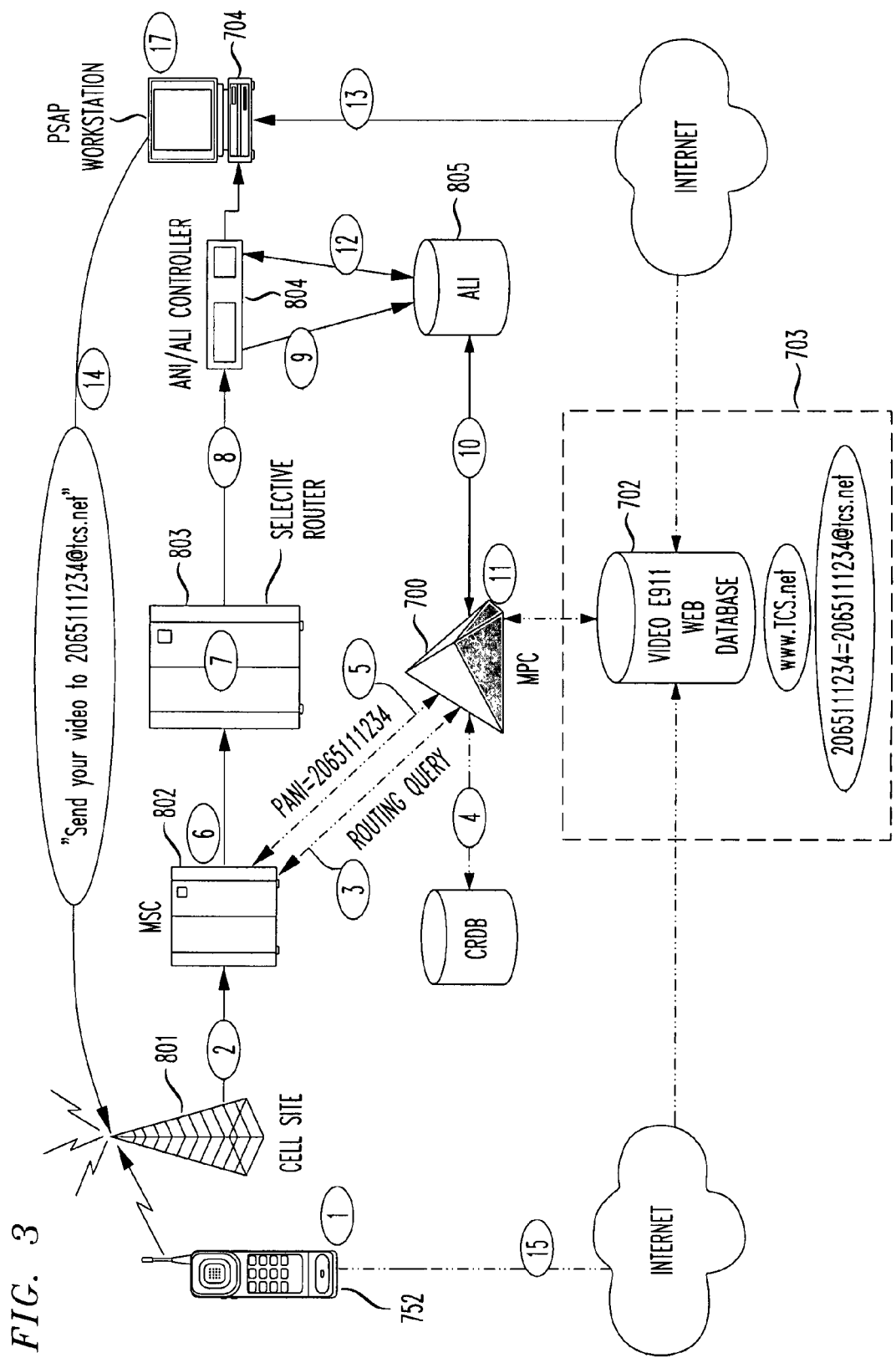
FIG. 3 shows exemplary steps to send a video E911 message to a relevant PSAP, in accordance with the principles of the present invention.
Figure 4:
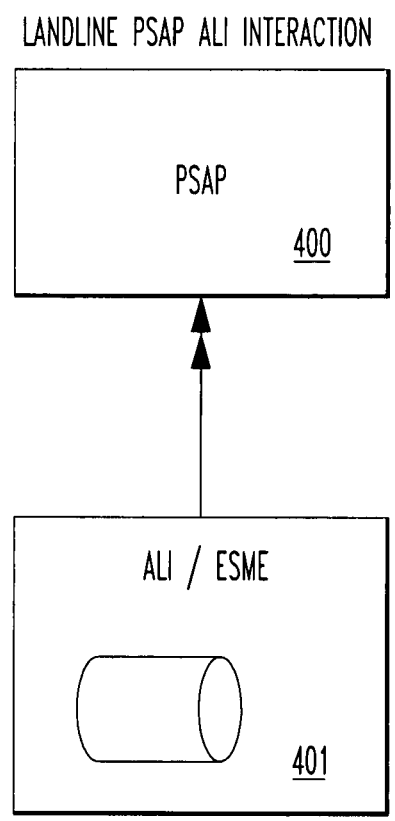
FIG. 4 shows a conventional landline public safety access point (PSAP) to automatic location identifier (ALI) connection.
Figure 5:
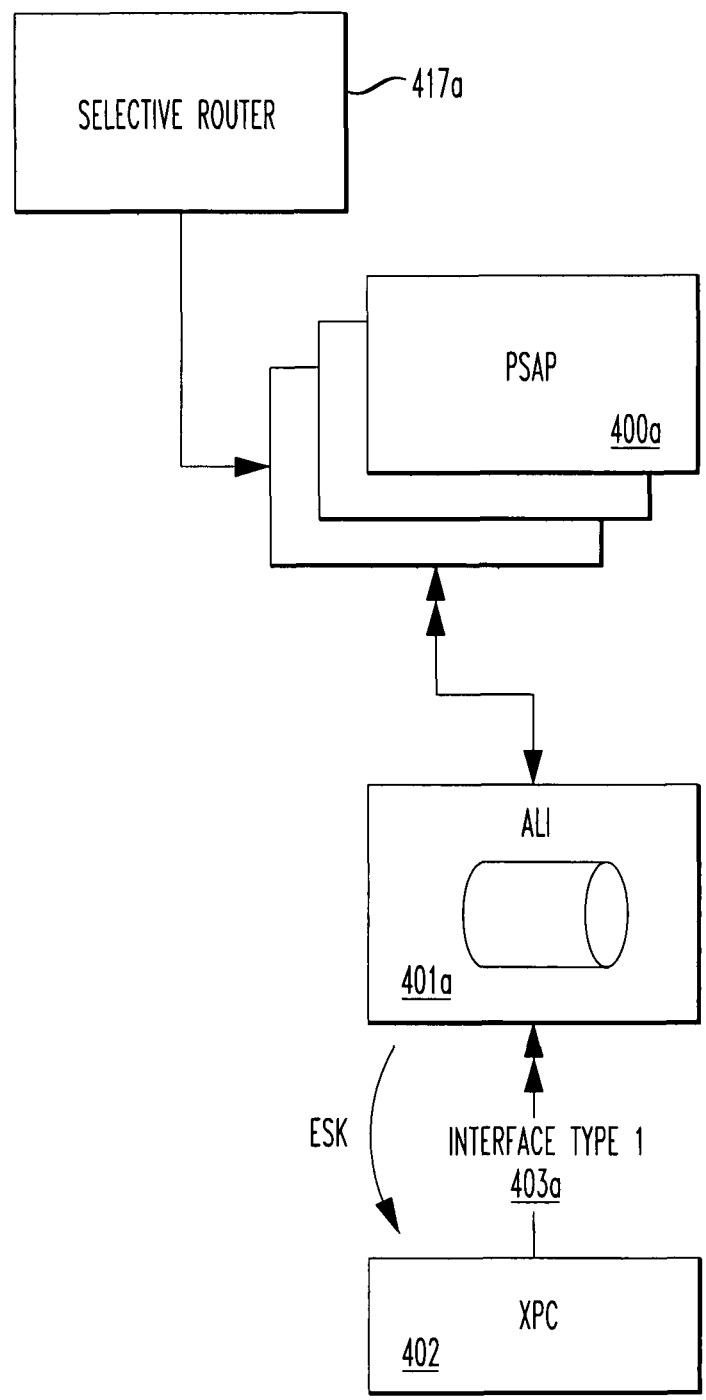
FIG. 5 shows a context diagram for a conventional non-landline positioning center (e.g., an Internet based voice over Internet Protocol (VOIP) positioning center).
Figure 6:
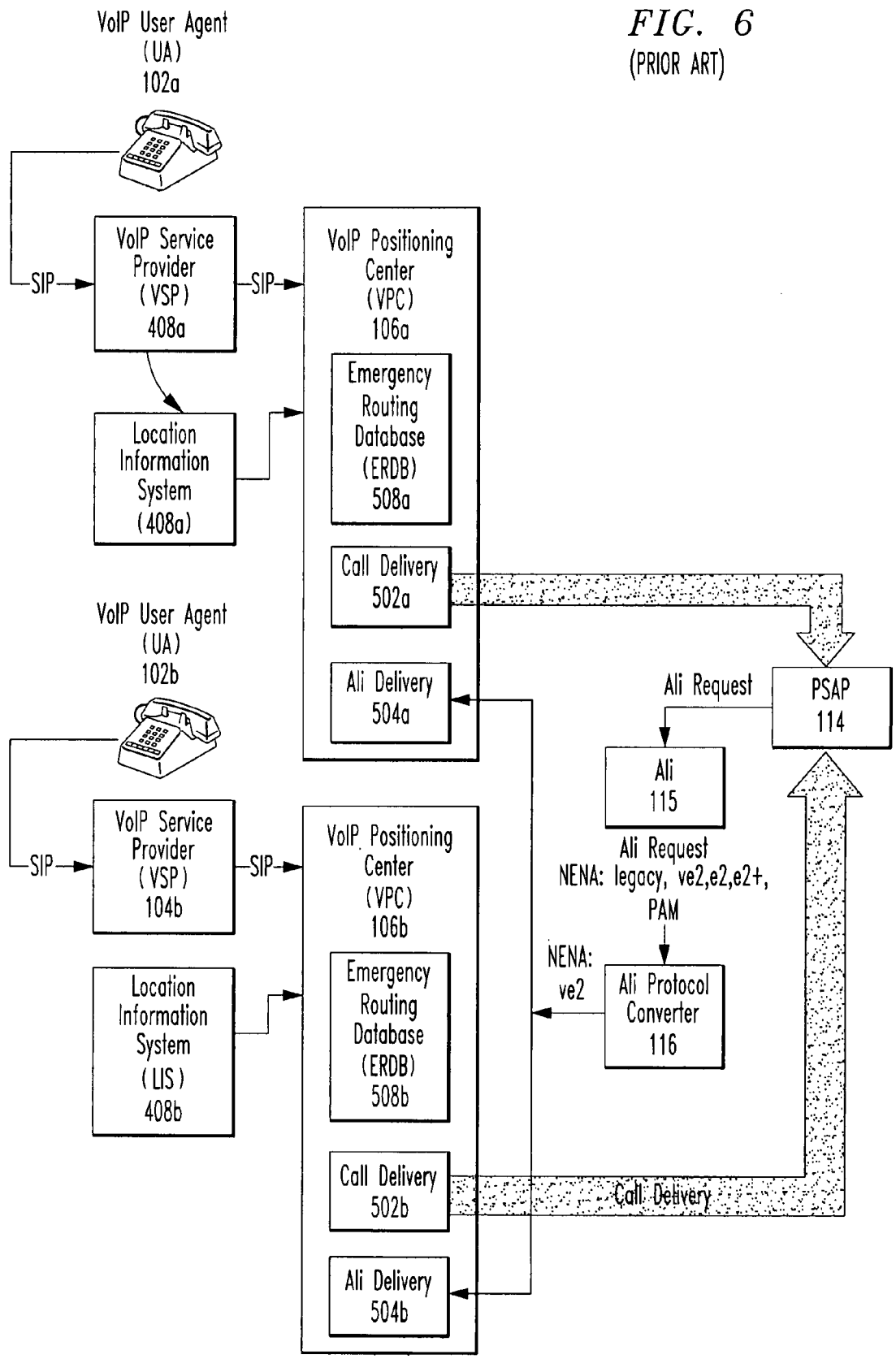
FIG. 6 shows basic conventional VoIP elements required to interconnect a VoIP emergency E911 caller to a relevant public safety access point (PSAP).
Figure 7:
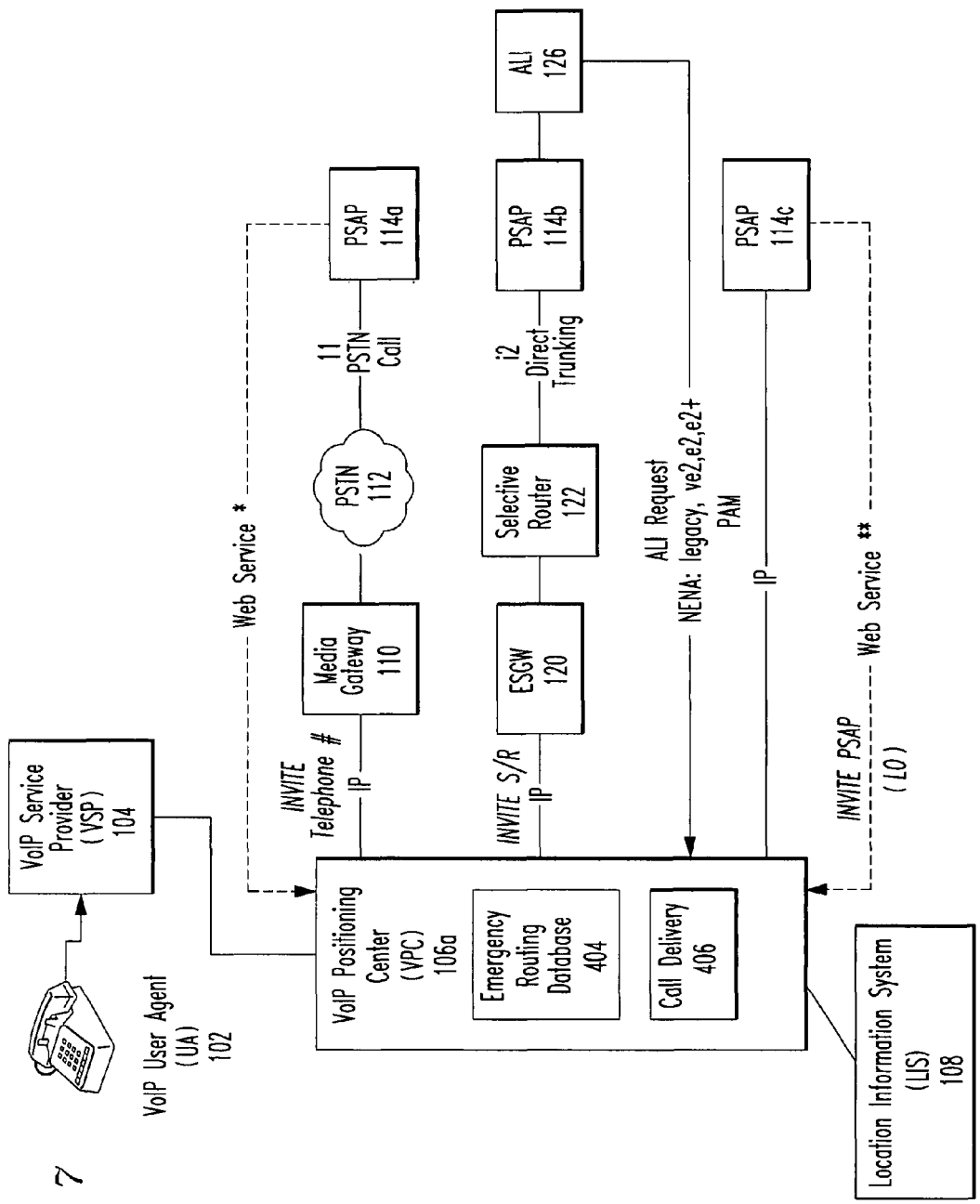
FIG. 7 shows in more detail conventional VoIP elements required by a VPC to interconnect a VoIP emergency E911 caller to a relevant public safety access point (PSAP).

FIG. 3 shows exemplary steps to send a video E911 message to a relevant PSAP, in accordance with the principles of the present invention.

In particular, as shown in step 1 of FIG. 3, an emergency E911 caller 752 dials 911. The emergency E911 call is routed to the nearest antenna 801 that received the emergency E911 call.

In step 2, the antenna 801 routes the emergency E911 call to the controlling mobile switching center (MSC) 802.

In step 3, the controlling MSC 802 queries the mobile positioning center (MPC) 700 for routing instructions. The query preferably includes an Emergency Service Routing Digit (ESRD) that identifies the cell site and sector.

In step 4, the MPC 700 recognizes the ESRD and determines the correct PSAP based upon the location and coverage of that sector. The MPC 700 stages automatic location identification (ALI) data in the MPC 700 and assigns a routing digit (ESRK) as a reference key for that record.

In step 5, the MPC 700 sends the ESRK back to the MSC 802.

In step 6, translations in the MSC 802 recognize the ESRK and cause the MSC 802 to egress the call on a specific trunk group. That trunk group leads to the selective router 803 that serves the intended PSAP 704.

In step 7, translations in the selective router 803 recognize the ESRK and route the call to the intended PSAP 704.

In step 8, the selective router 803 routes the emergency E911 call to the intended PSAP 704.

In step 9, at the PSAP 704, the ANI/ALI 804 controller interprets the ESRK as a typical landline phone number, and automatically generates an ALI query using that number.

In step 10, the ALI database 805 will recognize this ESRK and will "steer" the query to the MPC 700. Per J-Std 36, this is the E2 interface.

In step 11, upon receipt of the ALI query, the MPC 700 will recognize the ESRK and will retrieve the record previously cached in step 3 of FIG. 3. The MPC 700 sends the data in that record back to the ALI 805. In an available data field, the MPC 700 also sends a notice that additional info is available at a given video E911 web site. For example, one line of the responder field might include, "additional caller info available at www.TCS.net (i.e., at the www.tcs.net video E911 web site 703).

In step 12, the ALI 805 responds to the PSAP query with the staged data received from the MPC 700.

In step 13, the PSAP dispatcher 704 contacts the video E911 web site 703 and is prompted to enter or click on the ESRK. The PSAP dispatcher 704 is preferably then offered a menu of data options, such as "medical history", "residence data" or "video". The "video" option preferably includes an email address.

In step 14, the PSAP dispatcher 704 relays the video email address to the emergency E911 caller 752.

In step 15, the emergency E911 caller 752 emails the video to the designated video E911 email address.

While the invention has been described with reference to the exemplary embodiments thereof, those skilled in the art will be able to make various modifications to the described embodiments of the invention without departing from the true spirit and scope of the invention.

What is claimed is:

1. A method of associating digital image content with an emergency E911 caller, comprising:
   associating a dedicated unique emergency E911 email address with each pseudo Automatic Number Indicator (pANI) in said emergency E911 network; and
   staging digital video sourced by an emergency E911 caller identified by said dedicated unique emergency E911 email address.

2. A method of associating digital image content with an emergency E911 caller according to claim 1, further comprising:
   staging additional data relating to the emergency E911 caller, along with said digital video sourced by said emergency E911 caller.

3. A method of associating digital image content with an emergency E911 caller according to claim 1, wherein:
   said pANI is an emergency service routing key (ESRK).

4. A method of associating digital image content with an emergency E911 caller according to claim 1, wherein:
   said pANI is an emergency service query key (ESQK).

5. A method of associating digital image content with an emergency E911 caller according to claim 1, wherein:
   said digital video is sourced from a camera-equipped phone.

6. A method of associating digital image content with an emergency E911 caller according to claim 5, wherein:
   said digital video is a video clip.

7. A method of associating digital image content with an emergency E911 caller according to claim 5, wherein:
   said digital video is a live digital video data stream.

8. A method of associating digital image content with an emergency E911 caller according to claim 1, further comprising:
   a stored digital photograph sourced by an emergency E911 caller identified by said dedicated unique emergency E911 email.

9. A method of associating digital image content with an emergency E911 caller according to claim 8, wherein:
   said digital photograph is sourced from a camera-equipped phone.

10. In an emergency E911 network, apparatus for associating digital image content with an emergency E911 caller, comprising:
    means for associating a dedicated unique emergency E911 email address with each pseudo Automatic Number Indicator (pANI) in said emergency E911 network; and
    means for staging digital video sourced by an emergency E911 caller identified by said dedicated unique emergency E911 email address.

11. In an emergency E911 network, apparatus for associating digital image content with an emergency E911 caller according to claim 10, further comprising:
    means for staging additional data relating to the emergency E911 caller, along with said digital video sourced by said emergency E911 caller.

12. In an emergency E911 network, apparatus for associating digital image content with an emergency E911 caller according to claim 10, wherein:
    said pANI is an emergency service routing key (ESRK).

13. In an emergency E911 network, apparatus for associating digital image content with an emergency E911 caller according to claim 10, wherein:
    said pANI is an emergency service query key (ESQK).

14. In an emergency E911 network, apparatus for associating digital image content with an emergency E911 caller according to claim 10, wherein:
    said digital video is sourced from a camera-equipped phone.

15. In an emergency E911 network, apparatus for associating digital image content with an emergency E911 caller according to claim 14, wherein:
    said digital video is a video clip.

16. In an emergency E911 network, apparatus for associating digital image content with an emergency E911 caller according to claim 14, wherein:
    said digital video is a live digital video data stream.

17. In an emergency E911 network, apparatus for associating digital image content with an emergency E911 caller according to claim 10, wherein said digital video comprises:
    a digital photograph.

18. In an emergency E911 network, apparatus for associating digital image content with an emergency E911 caller according to claim 17, wherein:
    said digital photograph is sourced from a camera-equipped phone.

19. A method of associating digital image content with an emergency E911 caller, comprising:
    associating a dedicated unique emergency E911 email address with each pseudo Automatic Number Indicator (pANI) in said emergency E911 network; and
    staging, via a mobile positioning center, a digital video sourced by an emergency E911 caller identified by said dedicated unique emergency E911 email address.

20. A method of associating digital image content with an emergency E911 caller according to claim 19, further comprising:
    staging additional data relating to the emergency E911 caller, along with said digital video sourced by said emergency E911 caller.

21. A method of associating digital image content with an emergency E911 caller according to claim 19, wherein:
    said pANI is an emergency service routing key (ESRK).

22. A method of associating digital image content with an emergency E911 caller according to claim 19, wherein:
    said pANI is an emergency service query key (ESQK).

23. A method of associating digital image content with an emergency E911 caller according to claim 19, further comprising:
    staged digital video sourced by said emergency E911 caller identified by said dedicated unique emergency E911 email.

24. A method of associating digital image content with an emergency E911 caller according to claim 23, wherein:
    said digital video is sourced from a camera-equipped phone.

25. A method of associating digital image content with an emergency E911 caller according to claim 23, wherein:
    said digital video is a video clip.

26. A method of associating digital image content with an emergency E911 caller according to claim 23, wherein:
    said digital video is a live digital video data stream.

27. A method of associating digital image content with an emergency E911 caller according to claim 26, wherein:
    said digital photograph is sourced from a camera-equipped phone.

* * * * *